United States Patent
Nyholt et al.

(10) Patent No.: US 12,190,019 B2
(45) Date of Patent: Jan. 7, 2025

(54) NONDESTRUCTIVE TESTING SPECIMEN METHOD OF MANUFACTURE AND SYSTEM

(71) Applicant: John Nyholt Consulting, LLC, Friendswood, TX (US)

(72) Inventors: John Nyholt, Friendswood, TX (US); Adam Nyholt, Friendswood, TX (US)

( * ) Notice: Subject to any disclaimer, the term of this patent is extended or adjusted under 35 U.S.C. 154(b) by 0 days.

(21) Appl. No.: 18/052,512

(22) Filed: Nov. 3, 2022

(65) Prior Publication Data
US 2023/0185975 A1    Jun. 15, 2023

Related U.S. Application Data

(60) Provisional application No. 63/274,981, filed on Nov. 3, 2021.

(51) Int. Cl.
| | | |
|---|---|---|
| *G06F 30/10* | (2020.01) | |
| *G06F 117/02* | (2020.01) | |
| *G06F 119/18* | (2020.01) | |

(52) U.S. Cl.
CPC .......... *G06F 30/10* (2020.01); *G06F 2117/02* (2020.01); *G06F 2119/18* (2020.01)

(58) Field of Classification Search
None
See application file for complete search history.

(56) References Cited

PUBLICATIONS

Ozturk, Emre; Estimation of the Height of Surface Breaking Cracks using Ultrasonic Timing Methods; Apr. 2006; Middle East Technical University, p. iv, 7, 20, 66, 68, 70; https://open.metu.edu.tr/handle/11511/15978 (Year: 2006).*

Kolb, Dominik; Printing the invisible: bridging the gap between data and matter through voxel-based 3D printing; Jun. 2017; p. 1, 14, 15; MIT https://dspace.mit.edu/handle/1721.1/112911 (Year: 2017).*

Tian, Gui Yun; Multiple Sensors on Pulsed Eddy-Current Detection for 3-D Subsurface Crack Assessment; Feb. 2005; IEEE Sensors Journal; vol. 5; p. 90-96; https://ieeexplore.ieee.org/stamp/stamp.jsp?tp=&arnumber=1386227 (Year: 2005).*

(Continued)

*Primary Examiner* — Joni Hsu
(74) *Attorney, Agent, or Firm* — Shannon Warren

(57) ABSTRACT

A method of manufacture for creating an NDE test specimen with predictably located one or more flaws according to a digital flaw map and of a material having an angle of refraction matching industrial workpieces for testing and training is disclosed. Comprising selecting a workpiece material for the NDE test specimen having a substantially similar angle of refraction to industrial workpieces, fabricating the NDE test specimen from the workpiece material, executing a CAD software on one or more processors of a controller computer, reading the digital flaw map comprising coordinates of the one or more flaws to be applied to the NDE test specimen, controlling a high energy beam CNC to apply the digital flaw map to the NDE test specimen, selecting the workpiece material among crystal, borosilicate glass, and acrylic, applying a laser beam at a plurality of energy points within the NDE test specimen.

15 Claims, 10 Drawing Sheets

(56) References Cited

PUBLICATIONS

Hong Siang, Tan; Iterative Delayering and Electrical Fault Isolation for Defect Localization in 2.5D Packages; Dec. 2019; 2019 IEEE 21st Electronics Packaging Technology Conference (EPTC); p. 189-191; https://ieeexplore.ieee.org/stamp/stamp.jsp?tp=&arnumber=9026579 (Year: 2019).*

Kim, Yeonggeun; Detection of micro inclusions in steel sheets using high-frequency ultrasound speckle analysis; Oct. 2021; Scientific reports; p. 1-12; https://www.nature.com/articles/s41598-021-99907-4 (Year: 2021).*

Marini, R.; Performance Assessment of Penetrant and Magnetic Particle Systems used at Hellenic Aerospace Industry; Oct. 2007; 4th International Conference on NDT; p. 1-5; https://citeseerx.ist.psu.edu/document?repid=rep1&type=pdf&doi=b05a00cf5b8a3a5c0641af476ec42ba80ee0ec55 (Year: 2007).*

Taheri, Hossein; Investigation of Nondestructive Testing Methods for Friction Stir Welding; Apr. 2019; Metals; p. 4; https://www.mdpi.com/2075-4701/9/6/624 (Year: 2019).*

* cited by examiner

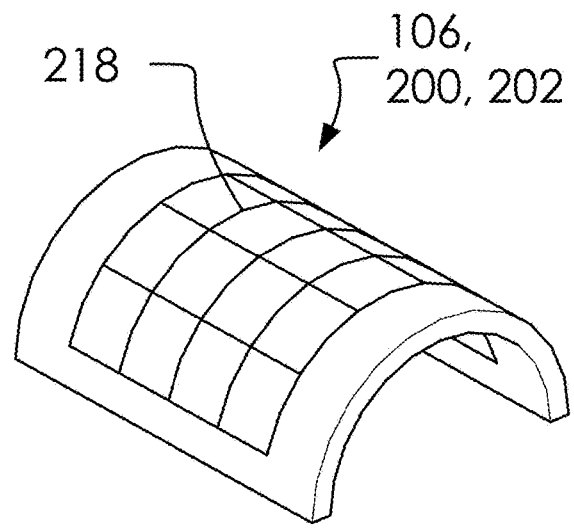
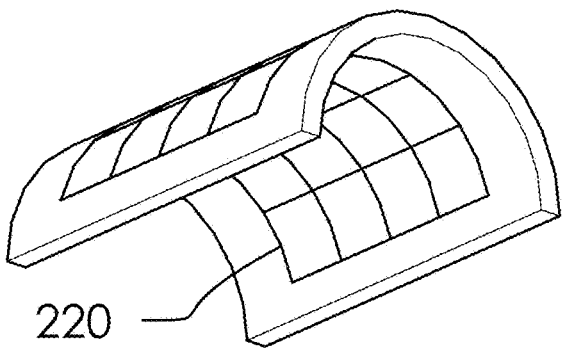
FIG. 2A
FIG. 2B
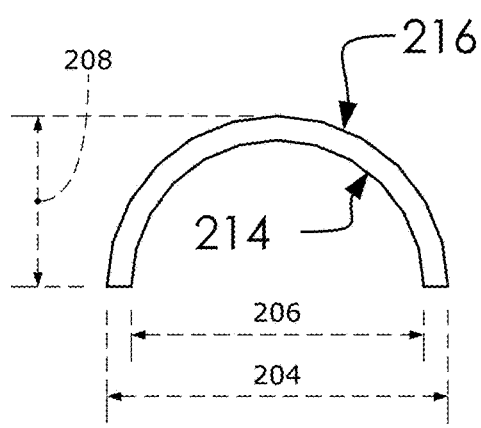
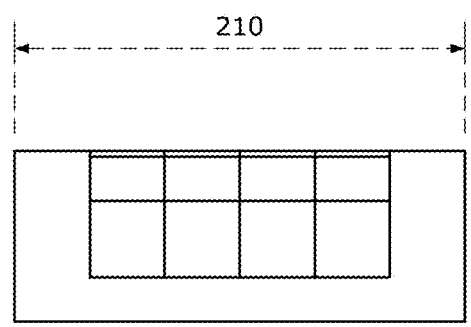
FIG. 2C
FIG. 2D

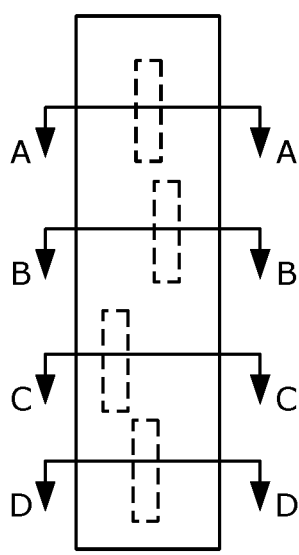
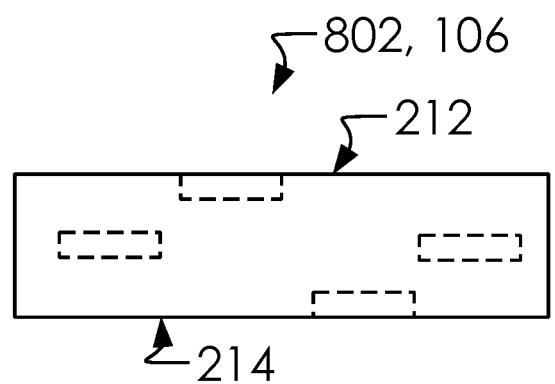
FIG. 8A
FIG. 8B
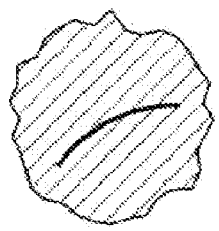
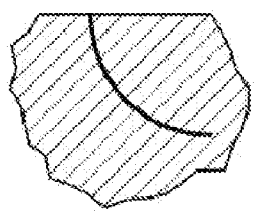
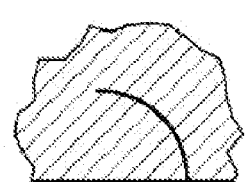
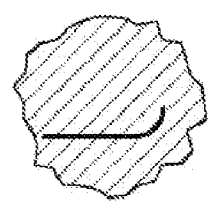
DETAIL A　　　DETAIL B　　　DETAIL C　　　DETAIL D
FIG. 8C　　　FIG. 8D　　　FIG. 8E　　　FIG. 8F

NONDESTRUCTIVE TESTING SPECIMEN METHOD OF MANUFACTURE AND SYSTEM

CROSS-REFERENCE TO RELATED APPLICATIONS

This application claims benefit to and incorporates by reference U.S. patent application 63/274,981 filed Nov. 3, 2021.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art seen to anticipate the current disclosure is known to the Applicant. However, these references outline the state of the art: U.S. Pat. Nos. 8,865,296B2, 10,488,369B2, 5,169,475A, US20190170991A1, and US20200119684A1.

Current innovation falls within the field of nondestructive testing and evaluation of industrial equipment. When inspecting pressure vessels wings of aircraft and similar industrial equipment it is important to find flaws in those items without destroying the item in the process. It of course would be very easy to cut something open and find the flaws, however this destroys the end-product and is no longer useful for the intended purpose. The field of nondestructive testing has come about to accomplish the task of inspecting vessels without their destruction.

Nondestructive evaluation "NDE", uses all sorts of physics and physical properties to ascertain the composition of items.

A new idea has arisen 2 intentionally make flawed work items to test NDE practices. By intentionally making the flawed item the exact location size and nature of the flaw in the workpiece can be used to verify the quality of the test on nominal workpieces.

Disclosed herein, a method and system for creating intentionally flawed work pieces.

BRIEF SUMMARY OF THE INVENTION

A method of manufacture for creating an NDE test specimen with predictably located one or more flaws according to a digital flaw map for training user of and testing results from an NDE testing equipment is disclosed. Comprising selecting a workpiece material for said NDE test specimen comprising an angle of refraction substantially like an industrial equipment material typically inspected by said NDE testing equipment, fabricating said NDE test specimen from said workpiece material, executing a CAD software and a CNC software on one or more processors of a controller computer, reading said digital flaw map comprising coordinates of said one or more flaws to be applied to said NDE test specimen with said CAD software, controlling a high energy beam CNC with said CNC software to apply said digital flaw map to said NDE test specimen, selecting said workpiece material among crystal, borosilicate glass, and acrylic. applying a laser beam at a plurality of energy points within a portion of said NDE test specimen using said high energy beam CNC, micro-fracturing a portion of an internal volume of said NDE test specimen to create a plurality of micro-fractured flaws using a virtographing process, and applying said laser beam according to said digital flaw map to create said plurality of micro-fractured flaws. Said high energy beam CNC comprises a laser system for generating said laser beam. Said digital flaw map comprises a 3D matrix comprising location and intensity data in an x-axis, a y-axis and a z-axis.

Said method of manufacture for creating said NDE test specimen with predictably located said one or more flaws according to said digital flaw map for training user of and testing results from said NDE testing equipment is disclosed. Comprising selecting said workpiece material for said NDE test specimen comprising an angle of refraction substantially like an industrial equipment material typically inspected by said NDE testing equipment, fabricating said NDE test specimen from said workpiece material, executing said CAD software and said CNC software on said one or more processors of said controller computer, reading said digital flaw map comprising coordinates of said one or more flaws to be applied to said NDE test specimen with said CAD software, and controlling said high energy beam CNC with said CNC software to apply said digital flaw map to said NDE test specimen.

An NDE specimen manufacturing system for manufacturing said NDE test specimen with predictably located said one or more flaws according to said digital flaw map for training user of and testing results from said NDE testing equipment. Said NDE specimen manufacturing system comprises said controller computer having a memory and said one or more processors, said high energy beam CNC, and said NDE test specimen of said workpiece material. Said memory comprises said CAD software, said CNC software and said digital flaw map. Said workpiece material for said NDE test specimen comprising an angle of refraction substantially like an industrial equipment material typically inspected by said NDE testing equipment. Said NDE test specimen is fabricated from said workpiece material. Said one or more processors of said controller computer are configured to execute said CAD software and said CNC software. Said CAD software is configured for reading said digital flaw map. Said digital flaw map comprises coordinates of said one or more flaws to be applied to said NDE test specimen. Said CNC software is configured for controlling said high energy beam CNC to apply said digital flaw map to said NDE test specimen.

BRIEF DESCRIPTION OF THE SEVERAL VIEWS OF THE DRAWING

FIGS. 2A, 2B, 2C, and 2D illustrate two perspective overviews and two elevated side views of a first NDE test specimen 200.

FIGS. 8A, 8B, 8C, 8D, 8E, and 8F illustrate an elevated top view, elevated side view and a detailed cross-section view of a first flaw 800a, a second flaw 800b, a third flaw 800c, and a fourth flaw 800d in a fourth NDE test specimen 802.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
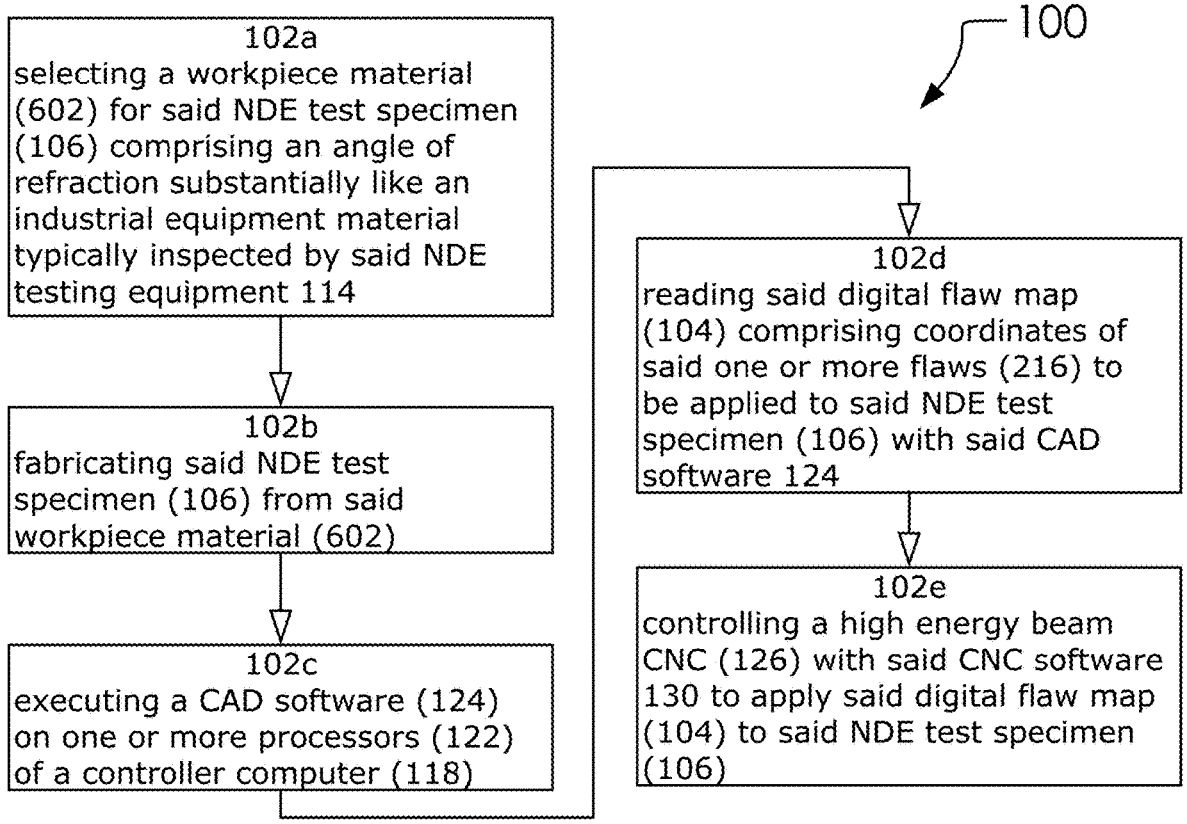
FIGS. 1A and 1B illustrate a method of manufacture 100 of an NDE test specimen 106 and a CNC diagram 116, respectively.
Figure 1B:
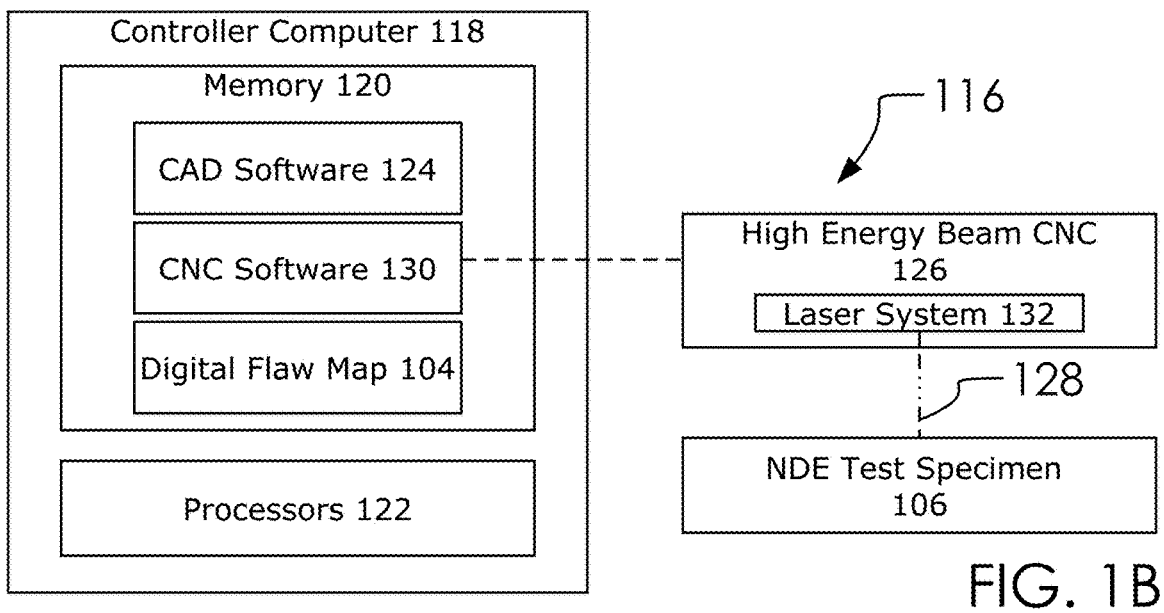

FIGS. 1A and 1B illustrate a method of manufacture 100 of an NDE test specimen 106 and a CNC diagram 116, respectively.

Said method of manufacture 100 can comprise first step 102a, a second step 102b, a third step 102c, a fourth step 102d and a fifth step 102e, as illustrated.

Said method of manufacture 100 can comprise creating a digital flaw map 104 to be applied to said NDE test specimen 106; applying said digital flaw map 104 to said NDE test specimen 106 using a high energy beam CNC 126; and testing said NDE test specimen 106 using an NDE testing equipment 114.

Said CNC diagram 116 illustrates a controller computer 118 having a memory 120 and one or more processors 122, said memory 120 can comprise a CAD software 124, a CNC software 130 and said digital flaw map 104, said CAD software 124 can be configured to create and read said digital flaw map 104, said CNC software 130 can be configured to control said high energy beam CNC 126 according to said digital flaw map 104, and said CAD software 124 can be configured to modify said NDE test specimen 106 according to said digital flaw map 104.

Said digital flaw map 104 can be created with said CAD software 124. Said digital flaw map 104 can comprise one or more flaws 216 (illustrated below) comprising real-world flaws found in industrial workpieces. Said one or more flaws 216 can comprise 2D and 3D marks, voids, and irregularities to be applied to said NDE test specimen 106.

In one embodiment, said high energy beam CNC 126 can comprise said high energy beam CNC 126 configured to laser ablation or laser vitrography with a laser beam 128 generated by a laser system 132, as discussed below.

In one embodiment, an NDE specimen manufacturing system 134 can comprise said controller computer 118 having said memory 120 and said one or more processors 122, said high energy beam CNC 126; wherein, said memory 120 can comprise said CAD software 124, said CNC software 130 and said digital flaw map 104.

FIGS. 2A, 2B, 2C, and 2D illustrate two perspective overviews and two elevated side views of a first NDE test specimen 200.

In one embodiment, said first NDE test specimen 200 can comprise said NDE test specimen 106 in a curved configuration 202.

Said curved configuration 202 can comprise a curved shape being substantially in a pipe shape having been cut in half lengthwise. In one embodiment, said curved configuration 202 can comprise an external diameter 204, an internal diameter 206, a height 208 and a length 210.

In one embodiment, said first NDE test specimen 200 can comprise said one or more flaws 216 on a top surface 212, a bottom surface 214, and/or located within said first NDE test specimen 200 and below said top surface 212 and/or said bottom surface 214, as discussed below.

One advantage of said first NDE test specimen 200 in said curved configuration 202 can comprise mimicking a real-world flaw in a pipe. In one embodiment, said one or more flaws 216 can be applied to said bottom surface 214 and a user can operate sensors on said one or more flaws 216 to locate said bottom surface 214 without seeing said one or more flaws 216. In one embodiment, said first NDE test specimen 200 can further comprise a topside grid 218 and a bottom-side grid 220. Wherein, users of said first NDE test specimen 200 can locate a grid location in said topside grid 218 and test the quality of said NDE testing equipment 114 by comparing output from said NDE testing equipment 114 with actual locations of said one or more flaws 216.

Figure 3:
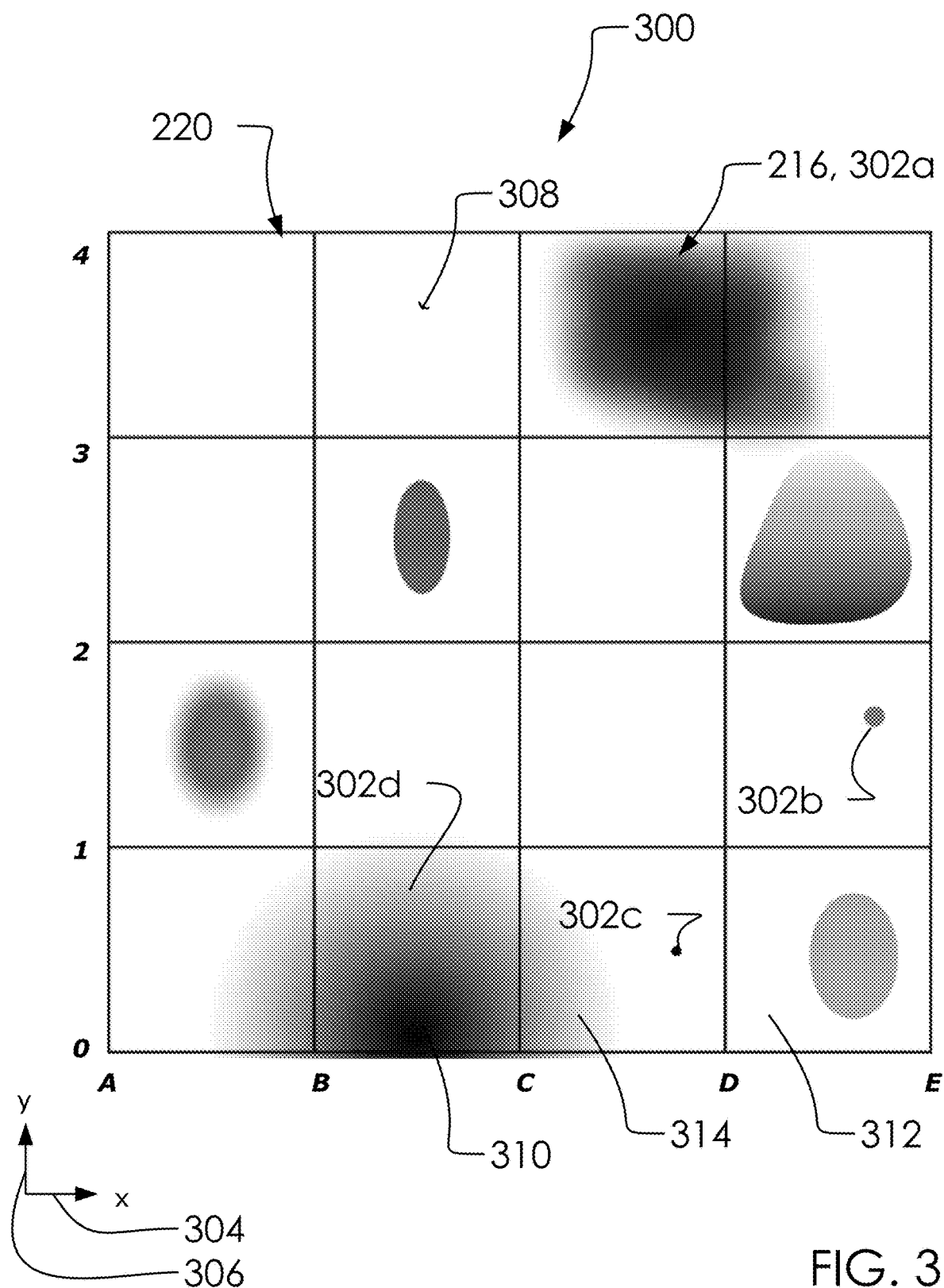
FIG. 3 illustrates a flaw diagram 300.

FIG. 3 illustrates a flaw diagram 300.

In one embodiment, said flaw diagram 300 can be applied to said bottom-side grid 220 of said first NDE test specimen 200. In one embodiment, said method of manufacture 100 can comprise applying said flaw diagram 300 to said bottom-side grid 220 of said bottom-side grid 220.

In one embodiment, said one or more flaws 216 can comprise at least a first flaw 302a, a second flaw 302b, a third flaw 302c, and a fourth flaw 302d, as illustrated.

In one embodiment, said flaw diagram 300 can comprise a 2D map comprising a matrix of said one or more flaws 216 placed along an x-axis 304 and a y-axis 306.

In one embodiment, said flaw diagram 300 can be stored on a computer system as a greyscale image file 308 comprising white space and variations of color between white and black, as is known in the art. Although a plurality of horizontal and vertical lines is drawn in FIG. 3, these may not be included in said greyscale image file 308. Said method of manufacture 100 can comprise applying said one or more flaws 216 to said bottom surface 214 with flaws being engraved into said bottom surface 214 with more intensity where said greyscale image file 308 comprises a black pixel 310, no intensity where said greyscale image file 308 comprises a white pixel 312, and a proportional intensity according to the darkness of a grey pixel 314.

Accordingly, FIG. 3 can be understood to comprise said first flaw 302a being an intense flaw that falls off quickly at its edges; said second flaw 302b comprises a relatively small and middle intensity flaw, said third flaw 302c comprises and even smaller but more intense flaw compared with said second flaw 302b, and said fourth flaw 302d comprises a large flaw with relatively gradually falling off intensity, as illustrated.

In this way, a test designer can arrange tests on said first NDE test specimen 200 for users to ascertain the quality of their testing skills as with said NDE testing equipment 114.

In one embodiment, said one or more flaws 216 can be burned into said bottom surface 214 of said first NDE test specimen 200 using said high energy beam CNC 126.

In one embodiment, said high energy beam CNC 126 can comprise a laser cutter and the darkness of said black pixel 310 can comprise a depth setting of said laser cutter. Wherein, said grey pixel 314 moving between said white pixel 312 and said black pixel 310 can be substantially rounded relative to a surface of said first NDE test specimen 200.

Figure 4A:
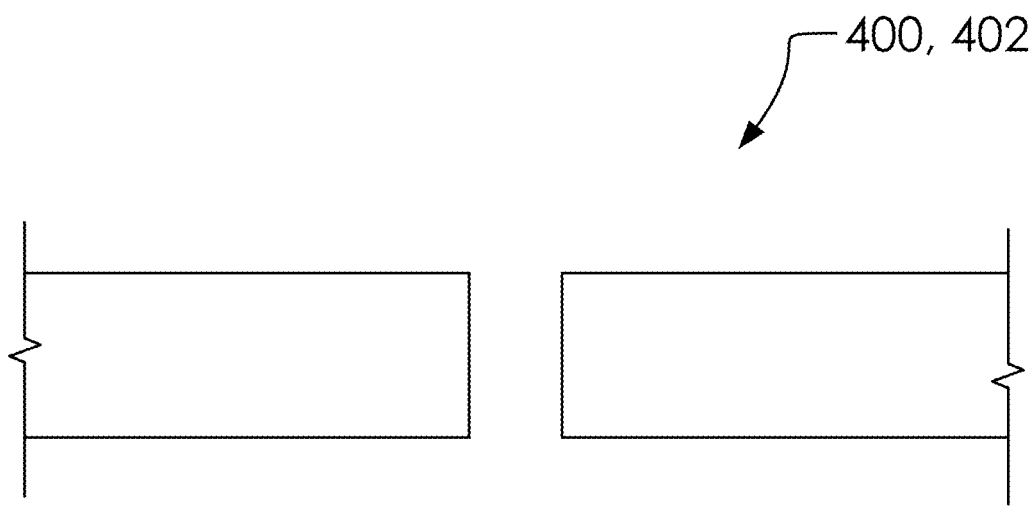
FIGS. 4A, and 4B illustrate an elevated side view of two welded pieces 400 in a detached configuration 402 and a welded configuration 404.
Figure 4B:
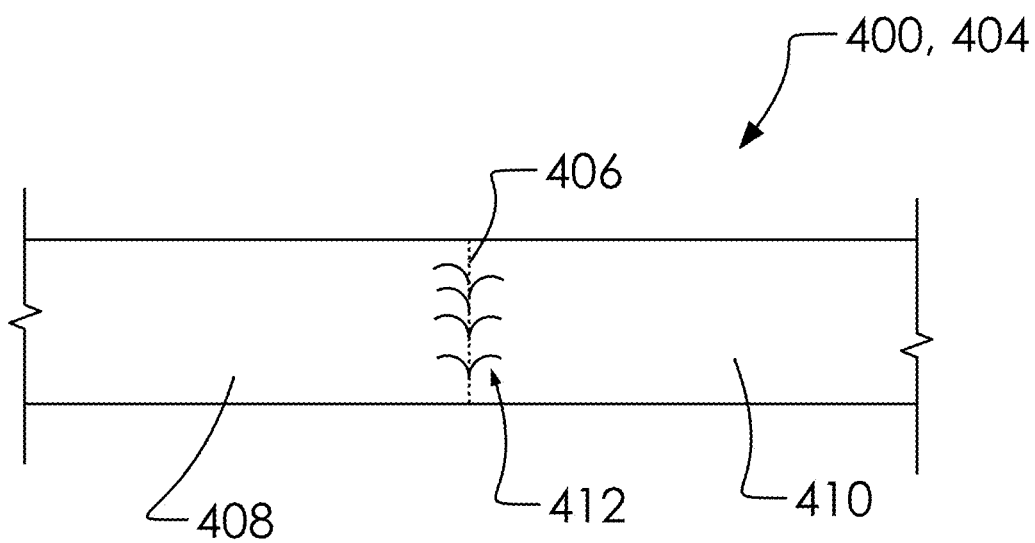

FIGS. 4A, and 4B illustrate an elevated side view of two welded pieces 400 in a detached configuration 402 and a welded configuration 404.

In one embodiment, said NDE testing equipment 114 can be employed to find flaws at a weld joint 406 between pipes or other workpieces. Illustrated in FIGS. 4A-4B comprises a first pipe 408 and a second pipe 410 being in said detached configuration 402 and said welded configuration 404.

In one embodiment, said weld joint 406 can be created by heating up the workpieces pressing them together and creating said weld joint 406. In some cases, said weld joint 406 can have the side effect of creating one or more curved flaws 412.

One goal of said method of manufacture 100 is to mimic the flaws commonly found on said two welded pieces 400. One such embodiment can comprise the presence of said one or more curved flaws 412 at said weld joint 406.

Figure 5A:
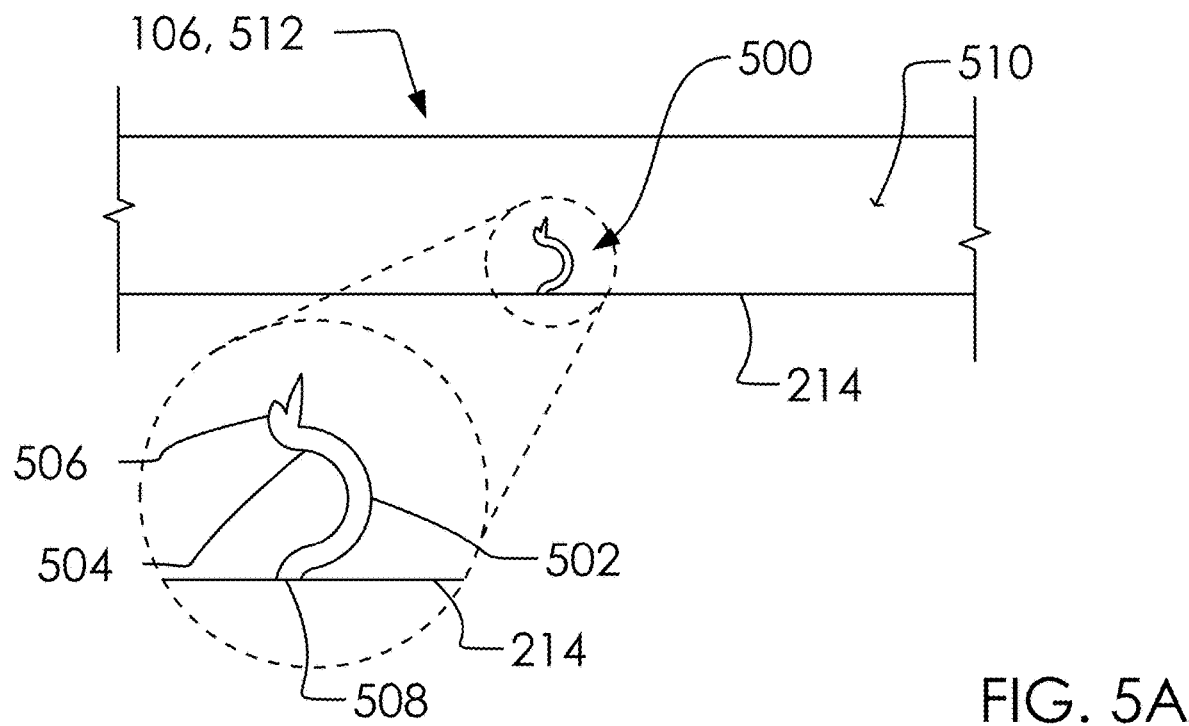
FIGS. 5A and 5B illustrate an elevated side view and a perspective overview of a hook flaw 500 in a second NDE test specimen 512.
Figure 5B:
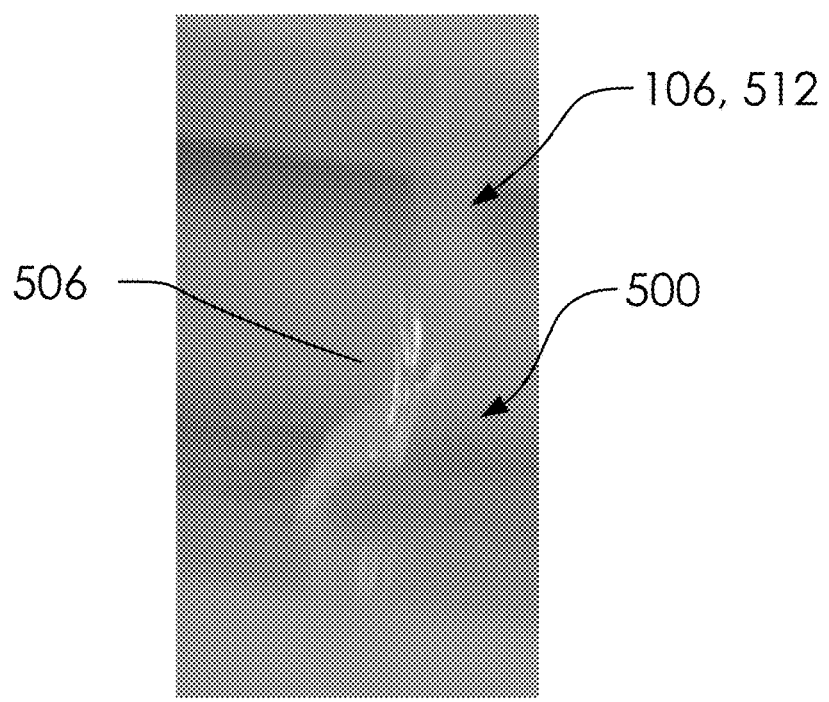

FIGS. 5A and 5B illustrate an elevated side view and a perspective overview of a hook flaw 500 in a second NDE test specimen 512.

Said second NDE test specimen 512 can comprise said NDE test specimen 106 with said hook flaw 500.

In one embodiment, said second NDE test specimen 512 can comprise said hook flaw 500 which can occur in the field and cause structural damage to industrial equipment. In one embodiment, said NDE testing equipment 114 can sense and locate said hook flaw 500 to ensure the integrity of said equipment.

In one embodiment, said one or more flaws 216 can comprise said hook flaw 500 which can comprise a hook portion 502, a tip 504, a tip flare 506 and a surface connection 508. In one embodiment, said hook flaw 500 can occur without connecting to said bottom surface 214 and or said top surface 212 and therefore can lack said surface connection 508. In one embodiment, said tip flare 506 can naturally occur as a crack at the top of said tip 504. One goal of said method of manufacture 100 is to mimic said tip flare 506 intentionally during the design of said second NDE test specimen 512 by applying additional power when carving said tip 504 to cause said tip flare 506 to be engraved into said second NDE test specimen 512.

As noted, said laser beam 128 can be configured for micro-fracturing a portion of an internal volume 510 of said NDE test specimen 106.

Figure 6:
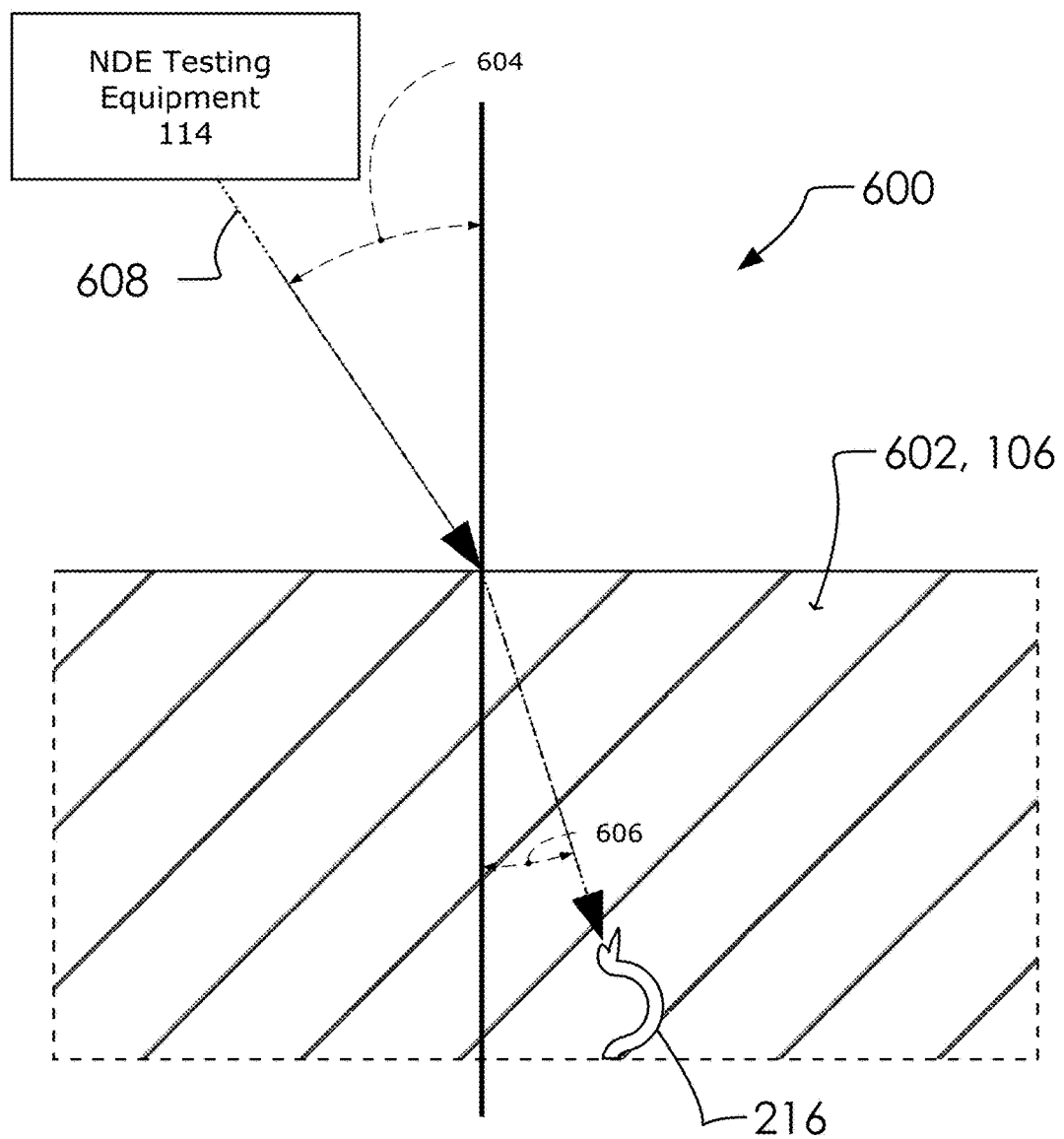
FIG. 6 illustrates a Snell's law diagram 600.

FIG. 6 illustrates a Snell's law diagram 600.

One objective of said method of manufacture 100 is the selection of an appropriate material for 106/ to ensure a correct movement of energy when emitted and received by said NDE testing equipment 114. To better understand this requirement, it is helpful to introduce Snell's Law, which predicts the angle of refraction between materials.

Accordingly, said method of manufacture 100 can comprise selection of a workpiece material 602 comprising a substantially similar angle of refraction to steel and metal industrial workpieces, such as pipe. Suitable materials known to the Applicant can comprise, but are not limited to, crystal, borosilicate glass, and acrylic.

Snell's law (also known as Snell-Descartes law and the law of refraction) is a formula used to describe the relationship between the angles of incidence and refraction, when referring to light or other waves passing through a boundary between two different isotropic media, such as water, glass, or air. Wherein, an entering angle 604 and an exiting angle 606 have the relationship to one another described by Snell's law and will have a similar relationship whether in steel or said workpiece material 602.

In one embodiment, said NDE testing equipment 114 can generate and read an inspection wave 608, such as a sound wave, which can be refracted when entering into and exiting said NDE test specimen 106. Said method of manufacture 100 can comprise selecting said workpiece material 602 which can both be modified by said high energy beam CNC 126 according to said digital flaw map 104 and comprise an angle of refraction substantially like an industrial equipment material typically inspected by said NDE testing equipment 114.

According to said method of manufacture 100, said NDE testing equipment 114 can locate said one or more flaws 216 and calibrate a user's skills whether in steel or said workpiece material 602.

As for said method of manufacture 100 and said NDE testing equipment 114, important characteristics of said workpiece material 602 can comprise the velocity of sound emitted and received by said NDE testing equipment 114 through said workpiece material 602, acoustic implementation and attenuation.

One additional benefit to a portion of the identified materials of said method of manufacture 100 can comprise opacity of some materials used by said workpiece material 602. For example, an operator may test use of said NDE testing equipment 114 on a substantially clear material having a substantially similar angle of refraction to the original workpiece. Thereby, the operator can see what said one or more flaws 216 look like visually while testing with said NDE testing equipment 114. Accordingly, an intuitive knowledge of the power of said NDE testing equipment 114 and underlying flaws can be developed more completely than using a hidden flaw.

Figure 7A:
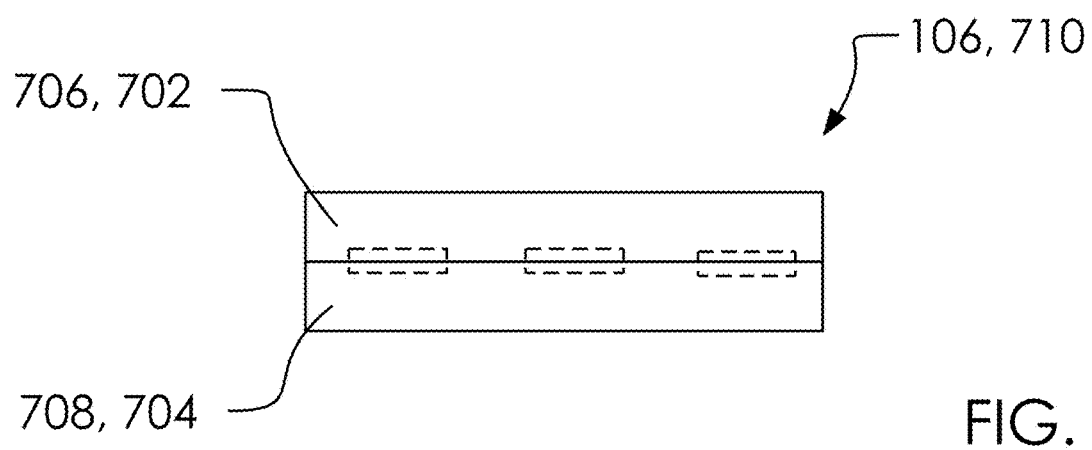
FIGS. 7A, and 7B illustrate a superficial flaw 700 between a first layer 702 and a second layer 704 of a third NDE test specimen 710.
Figure 7B:
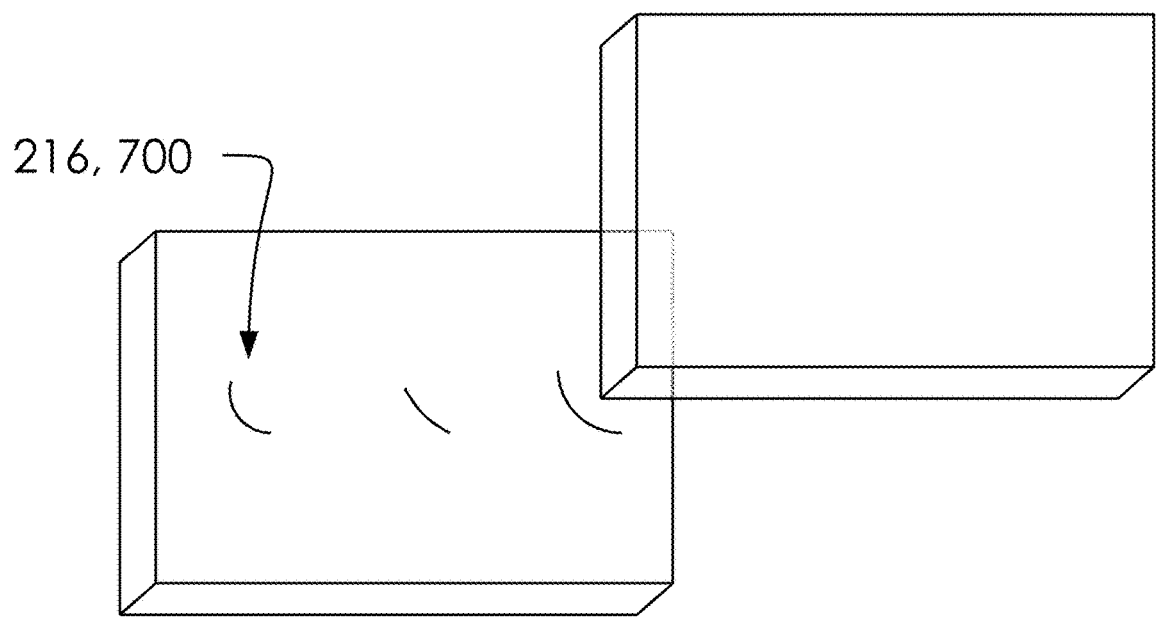

FIGS. 7A, and 7B illustrate a superficial flaw 700 between a first layer 702 and a second layer 704 of a third NDE test specimen 710.

In one embodiment, said third NDE test specimen 710 can comprise said NDE test specimen 106 with said first layer 702 and said second layer 704, as illustrated.

In one embodiment, said third NDE test specimen 710 can be constructed with said one or more flaws 216 being arranged on a surface of said third NDE test specimen 710, for example said curved configuration 202 can comprise said one or more flaws 216 arranged on said bottom surface 214.

In another embodiment, said third NDE test specimen 710 can comprise a first workpiece layer 706 and a second workpiece layer 708; wherein, said one or more flaws 216 can be in a top surface of said second workpiece layer 708 or in a bottom surface of said first workpiece layer 706; and said first workpiece layer 706 can be affixed to said second workpiece layer 708 with said one or more flaws 216 being between the layers.

In one embodiment, said method of manufacture 100 can comprise arranging said one or more flaws 216 between said first workpiece layer 706 and said second workpiece layer 708 of said third NDE test specimen 710.

In one embodiment, said first workpiece layer 706 and said second workpiece layer 708 can be bonded together and can mimic dissimilar metals being fused to one another.

FIGS. 8A, 8B, 8C, 8D, 8E, and 8F illustrate an elevated top view, elevated side view and a detailed cross-section view of a first flaw 800a, a second flaw 800b, a third flaw 800c, and a fourth flaw 800d in a fourth NDE test specimen 802.

In one embodiment, said fourth NDE test specimen 802 can comprise said NDE test specimen 106, as illustrated.

In one embodiment, said first flaw 800a and said fourth flaw 800d can be between said top surface 212 and said bottom surface 214, said second flaw 800b can start in said top surface 212, and said third flaw 800c can start at said bottom surface 214, as illustrated.

In one embodiment, said method of manufacture 100 can comprise introducing said one or more flaws 216 between and/or touching either said top surface 212 and or said bottom surface 214. One method of introducing a 3D flaw in said NDE test specimen 106 is introduced to follow.

Figure 9A:
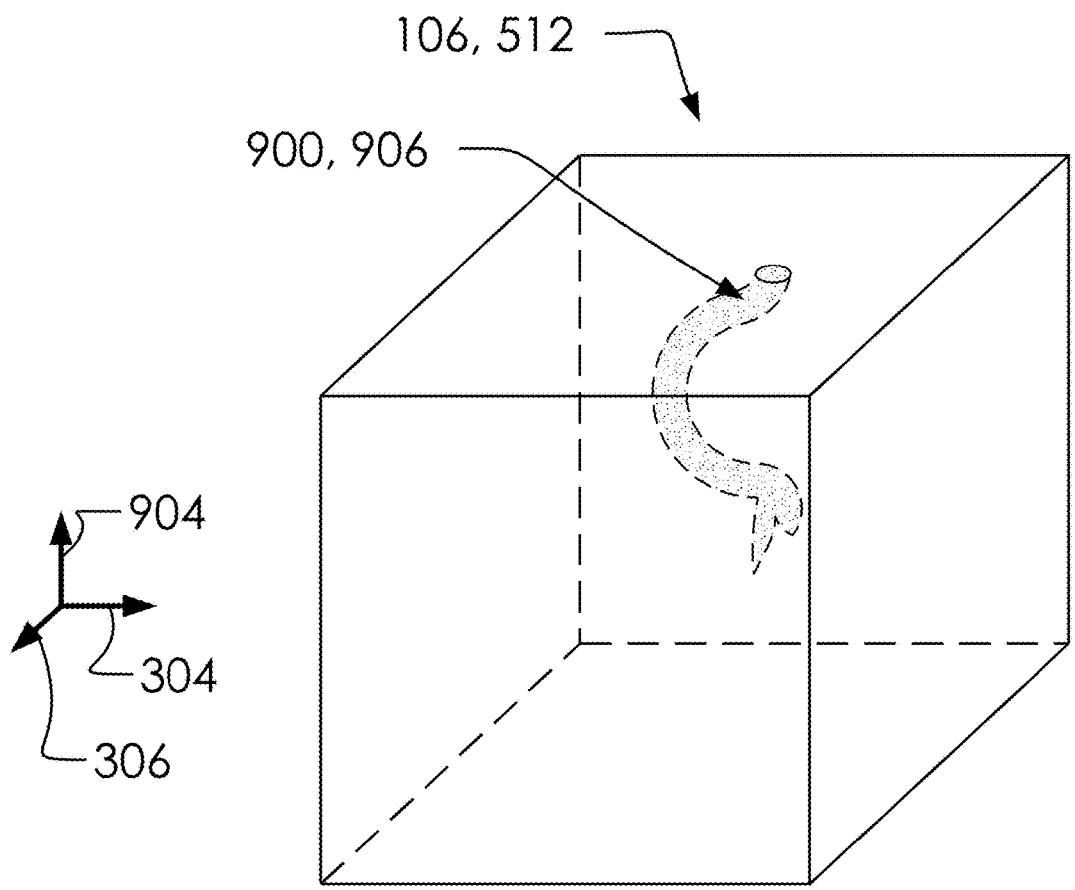
FIGS. 9A, 9B and 9C illustrate a plurality of microfractured flaws 900 in said second NDE test specimen 512 in a perspective overview, and first and second elevated side views.
Figure 9B:
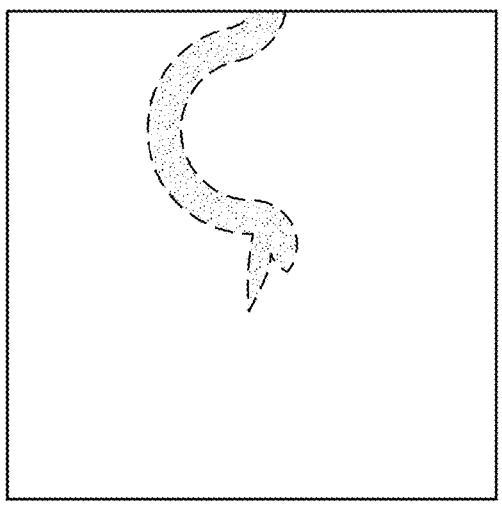
Figure 9C:
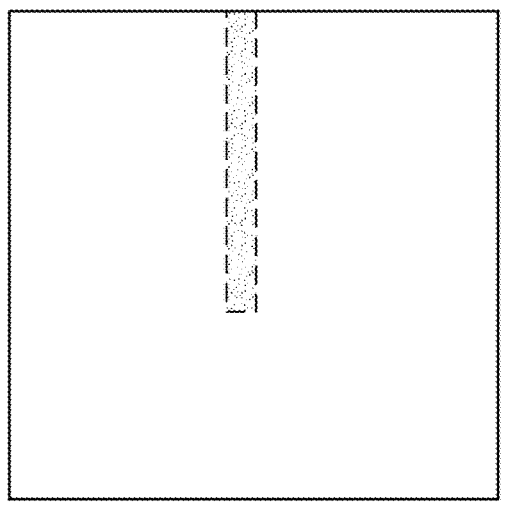

FIGS. 9A, 9B and 9C illustrate a plurality of micro-fractured flaws 900 in said second NDE test specimen 512 in a perspective overview, and first and second elevated side views.

As illustrated, said plurality of micro-fractured flaws 900 can comprise said hook flaw 500 having said tip flare 506.

In one embodiment, said method of manufacture 100 can comprise said plurality of micro-fractured flaws 900 in a 3D space according to said digital flaw map 104 comprising a 3D flaw map comprising a location and an intensity data in said x-axis 304, said y-axis 306 and a z-axis 904.

In one embodiment, said micro-fracturing can comprise starburst cracks in said workpiece material 602 being planar defects with no loss of volume. When clumped together said plurality of micro-fractured flaws 900 can be read by said NDE testing equipment 114 as a single reflective surface like said one or more flaws 216 in industrial equipment. Said method of manufacture 100 can further comprise controlling a density of said plurality of micro-fractured flaws 900 to modify a reflectivity of said plurality of micro-fractured flaws 900 for said NDE testing equipment 114.

Figure 10:
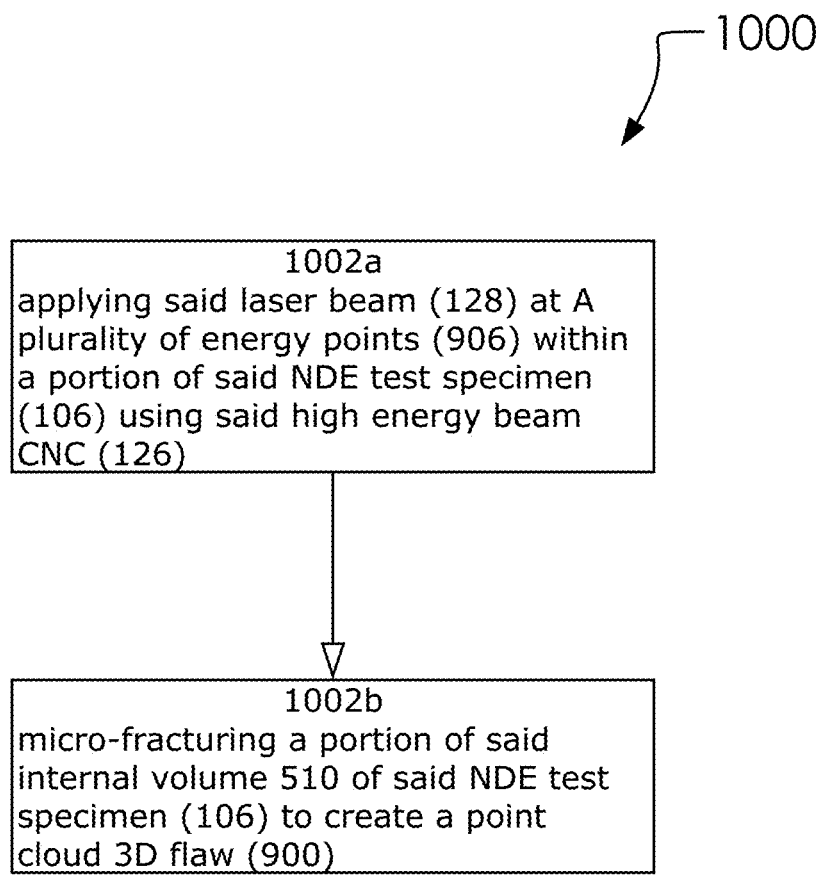
FIG. 10 illustrates a virtographing process 1000.

FIG. 10 illustrates a virtographing process 1000.

Said virtographing process 1000 can comprise a first steps 1002a and a second steps 1002b, as illustrated.

In one embodiment, said method of manufacture 100 can further comprise applying said digital flaw map 104 to said NDE test specimen 106 using said virtographing process 1000.

In one embodiment, said virtographing process 1000 can comprise applying a plurality of energy points 906 to said digital flaw map 104 according to said digital flaw map 104 in said x-axis 304, said y-axis 306 and said z-axis 904, and micro-fracturing a portion of said internal volume 510 of said NDE test specimen 106 to create said plurality of micro-fractured flaws 900.

As discussed above, said NDE test specimen 106 can comprise said workpiece material 602 to accommodate said virtographing process 1000.

Wherein, virtography or virtographing can comprise exposing laser beams to create 3D designs in said NDE test specimen 106. Further wherein, said plurality of micro-fractured flaws 900 can be created by creating many small points of fractures or other deformations within said NDE test specimen 106. In one embodiment, each point can be created by said laser beam 128 focused according to a computer-controlled opto-mechanical system. In one embodiment, tens of thousands of such points can be created to form said plurality of micro-fractured flaws 900.

In one embodiment, said method of manufacture 100 can comprise creating said plurality of energy points 906 according to said digital flaw map 104, and testing said NDE testing equipment 114 on said NDE test specimen 106. In one embodiment, said plurality of energy points 906 can perform in a similar manner as said hook flaw 500 or other flaws in said NDE test specimen 106 to train users of said NDE testing equipment 114.

In one embodiment, said plurality of energy points 906 can perform in a similar manner to naturally occurring flaws in said NDE test specimen 106, such as said hook flaw 500.

In one embodiment, said workpiece material 602 can comprise acrylic, plexiglass, or similar.

Said external diameter 204 can comprise as little as 1.5 inches in one embodiment.

In one embodiment, said NDE test specimen 106 can be used for technician's qualifying examinations as well as training.

In one embodiment, said greyscale image file 308 can comprise 0-255 levels of intensity as between black and white. Said greyscale image file 308 can be created from a 3D source file, a flat 2D image, or similar as would be understood in the art.

In one embodiment acrylic, silica, crystal and or glass peace can be used as a base material. Even though testing is generally done on metals and metal pieces, it has been determined that certain crystals have steel like characteristics. That is, various NDE technologies, such as ultrasonic testing, cannot tell the difference between a steel workpiece and certain crystal workpieces. One advantage of the current system is that creating flaws in crystal as much easier than making flaws in steel.

Indeed, crystal acrylic and glass can be deformed with laser inputs according to a 3-dimensional schematic. it is known that crystal can be carved blow its surface using laser inputs, and this technology has been used to create souvenirs and trophies in a process known as "vitrographie". This concept is carried forward in the field of NDE where the number of flaws that can be put in a piece of glass can be thousands 10 s of thousands or more. By creating intentional and well known and well-located flaws within the workpiece, NDE testing can be verified with very high fidelity.

In one embodiment, the workpiece can be an optimum grade crystal, to ensure minimal cracking and flaws.

In one embodiment can be used in place of glass or crystal.

In one embodiment, the laser can comprise is linear laser. Furthermore, the laser can be used to cut the workpieces according to a schematic.

In one embodiment the laser can create a weld overlay.

The following listing of the parts from this specification is included.

Said method of manufacture 100,
Said NDE test specimen 106,
Said CNC diagram 116,
Said first step 102a,
Said second step 102b,
Said third step 102c,
Said fourth step 102d, Said fifth step 102e,
Said digital flaw map 104,
Said high energy beam CNC 126,
Said NDE testing equipment 114,
Said controller computer 118,
Said memory 120,
Said one or more processors 122,
Said CAD software 124,
Said CNC software 130,
Said one or more flaws 216,
Said laser beam 128,
Said laser system 132,
Said NDE specimen manufacturing system 134,
Said first NDE test specimen 200,
Said curved configuration 202,
Said external diameter 204,
Said internal diameter 206,
Said height 208,
Said length 210,
Said top surface 212,
Said bottom surface 214,
Said topside grid 218,
Said bottom-side grid 220,
Said flaw diagram 300,
Said first flaw 302a,
Said second flaw 302b,
Said third flaw 302c,
Said fourth flaw 302d,
Said x-axis 304,
Said y-axis 306,
Said greyscale image file 308,
Said black pixel 310,
Said white pixel 312,
Said grey pixel 314,
Said two welded pieces 400,
Said detached configuration 402,
Said welded configuration 404,
Said weld joint 406,
Said first pipe 408,
Said second pipe 410,
Said one or more curved flaws 412,
Said hook flaw 500,
Said second NDE test specimen 512,
Said hook portion 502,
Said tip 504,
Said tip flare 506,
Said surface connection 508,
Said internal volume 510,
Said Snell's law diagram 600,
Said workpiece material 602,
Said entering angle 604,
Said exiting angle 606,
Said inspection wave 608,
Said superficial flaw 700,
Said first layer 702,
Said second layer 704,
Said third NDE test specimen 710,
Said first workpiece layer 706,
Said second workpiece layer 708,
Said first flaw 800a,
Said second flaw 800b,
Said third flaw 800c,
Said fourth flaw 800d,
Said fourth NDE test specimen 802,
Said plurality of micro-fractured flaws 900,
Said z-axis 904,
Said virtographing process 1000,
Said first steps 1002a,
Said second steps 1002b, and
said plurality of energy points 906.

One preferred embodiment can be summarized as follows.

Said method of manufacture 100 for creating said NDE test specimen 106 with predictably located said one or more flaws 216 according to said digital flaw map 104 for training user of and testing results from said NDE testing equipment 114 can comprise selecting said workpiece material 602 for said NDE test specimen 106 comprising an angle of refraction substantially like an industrial equipment material typically inspected by said NDE testing equipment 114, fabricating said NDE test specimen 106 from said workpiece material 602, executing said CAD software 124 and said CNC software 130 on said one or more processors 122 of said controller computer 118, reading said digital flaw map 104 comprising coordinates of said one or more flaws 216 to be applied to said NDE test specimen 106 with said CAD software 124, controlling said high energy beam CNC 126 with said CNC software 130 to apply said digital flaw map 104 to said NDE test specimen 106, selecting said workpiece material 602 among crystal, borosilicate glass, and acrylic. Applying said laser beam 128 at said plurality of energy points 906 within a portion of said NDE test specimen 106 using said high energy beam CNC 126, micro-fracturing a portion of said internal volume 510 of said NDE test specimen 106 to create said plurality of micro-fractured flaws 900 using said virtographing process 1000, and applying said laser beam 128 according to said digital flaw map 104 to create said plurality of micro-fractured flaws 900. Said high energy beam CNC 126 comprises said laser system 132 for generating said laser beam 128. Said digital flaw map 104 comprises a 3D matrix comprising location and intensity data in said x-axis 304, said y-axis 306 and said z-axis 904.

Said method of manufacture 100 for creating said NDE test specimen 106 with predictably located said one or more flaws 216 according to said digital flaw map 104 for training user of and testing results from said NDE testing equipment 114 can comprise selecting said workpiece material 602 for said NDE test specimen 106 comprising an angle of refraction substantially like an industrial equipment material typically inspected by said NDE testing equipment 114, fabricating said NDE test specimen 106 from said workpiece material 602, executing said CAD software 124 and said CNC software 130 on said one or more processors 122 of said controller computer 118, reading said digital flaw map 104 comprising coordinates of said one or more flaws 216 to be applied to said NDE test specimen 106 with said CAD software 124, controlling said high energy beam CNC 126 with said CNC software 130 to apply said digital flaw map 104 to said NDE test specimen 106, selecting said workpiece material 602 among crystal, borosilicate glass, and acrylic. Applying said laser beam 128 at said plurality of energy points 906 within a portion of said NDE test specimen 106 using said high energy beam CNC 126, micro-fracturing a portion of said internal volume 510 of said NDE test specimen 106 to create said plurality of micro-fractured flaws 900 using said virtographing process 1000, and applying said laser beam 128 according to said digital flaw map 104 to create said plurality of micro-fractured flaws 900. Said high energy beam CNC 126 comprises said laser system 132 for generating said laser beam 128. Said digital flaw map 104 comprises a 3D matrix comprising location and intensity data in said x-axis 304, said y-axis 306 and said z-axis 904.

Said method of manufacture 100 for creating said NDE test specimen 106 with predictably located said one or more flaws 216 according to said digital flaw map 104 for training user of and testing results from said NDE testing equipment 114 can comprise selecting said workpiece material 602 for said NDE test specimen 106 comprising an angle of refraction substantially like an industrial equipment material typically inspected by said NDE testing equipment 114, fabricating said NDE test specimen 106 from said workpiece material 602, executing said CAD software 124 and said CNC software 130 on said one or more processors 122 of said controller computer 118, reading said digital flaw map 104 comprising coordinates of said one or more flaws 216 to be applied to said NDE test specimen 106 with said CAD software 124, and controlling said high energy beam CNC 126 with said CNC software 130 to apply said digital flaw map 104 to said NDE test specimen 106.

Applying said laser beam 128 to said top surface 212 or said bottom surface 214 of said NDE test specimen 106 using said high energy beam CNC 126, and removing portions of said NDE test specimen 106 using laser ablation. Said high energy beam CNC 126 comprises said laser system 132 for generating said laser beam 128.

Said digital flaw map 104 comprises a 2D matrix comprising instructions for laser intensity and location for creation of said one or more flaws 216 on said NDE test specimen 106. Said digital flaw map 104 comprises said flaw diagram 300 comprising a 2D matrix of said one or more flaws 216 placed along said x-axis 304 and said y-axis 306.

Said flaw diagram 300 can be stored on a computer system as said greyscale image file 308 comprising white space and variations of color between white and black. Said method of manufacture 100 comprises applying said one or more flaws 216 to said bottom surface 214 with flaws being engraved into said bottom surface 214 with more intensity where said greyscale image file 308 comprises said black pixel 310, no intensity where said greyscale image file 308 comprises said white pixel 312, and a proportional intensity according to the darkness of said grey pixel 314.

Said NDE test specimen 106 comprises at least one flat surface among said top surface 212 and said bottom surface 214, said top surface 212 comprises said topside grid 218 and said bottom surface 214 comprises said bottom-side grid 220, and said high energy beam CNC 126 can be aligned with said topside grid 218 or said bottom-side grid 220 and apply said one or more flaws 216 according to said NDE test specimen 106.

Melting a portion of said NDE test specimen 106 around a cylinder shape to from said curved configuration 202 to mimic an industrial pipe shape.

Selecting said workpiece material 602 among crystal, borosilicate glass, and acrylic.

Said method of manufacture 100 comprises said virtographing process 1000. Said virtographing process 1000 comprises applying said laser beam 128 at said plurality of energy points 906 within a portion of said NDE test specimen 106 using said high energy beam CNC 126, and micro-fracturing a portion of said internal volume 510 of said NDE test specimen 106 to create said plurality of micro-fractured flaws 900. Said high energy beam CNC 126 comprises said laser system 132 for generating said laser beam 128. Said digital flaw map 104 comprises a 3D matrix comprising location and intensity data in said x-axis 304, said y-axis 306 and said z-axis 904.

Said method of manufacture 100 comprises said virtographing process 1000. Said virtographing process 1000 comprises applying said laser beam 128 at said plurality of energy points 906 within a portion of said NDE test specimen 106 using said high energy beam CNC 126, and micro-fracturing a portion of said internal volume 510 of said NDE test specimen 106 to create said plurality of micro-fractured flaws 900. Said high energy beam CNC 126 comprises said laser system 132 for generating said laser beam 128. Said digital flaw map 104 comprises a 3D matrix comprising location and intensity data in said x-axis 304, said y-axis 306 and said z-axis 904.

Said micro-fracturing comprises starburst cracks in said workpiece material 602 being planar defects with no loss of volume. When clumped together said plurality of micro-fractured flaws 900 can be read by said NDE testing equipment 114 as a single reflective surface like said one or more flaws 216 in industrial equipment.

Controlling a density of said plurality of micro-fractured flaws 900 to modify a reflectivity of said plurality of micro-fractured flaws 900 for said NDE testing equipment 114.

Said method of manufacture 100 further comprises introducing said one or more flaws 216 between and touching either said top surface 212 and or said bottom surface 214 of said NDE test specimen 106.

Said digital flaw map 104 can comprise said curved configuration 202 wherein, said digital flaw map 104 accounts for a curved shape of said bottom surface 214 and said one or more flaws 216 of said digital flaw map 104.

Said NDE test specimen 106 comprises said first workpiece layer 706 and said second workpiece layer 708. Said one or more flaws 216 can be in a top surface of said second workpiece layer 708 or in a bottom surface of said first workpiece layer 706. Said first workpiece layer 706 can be affixed to said second workpiece layer 708 with said one or more flaws 216 being between the layers.

Said NDE test specimen 106 comprises said first workpiece layer 706 and said second workpiece layer 708. Said one or more flaws 216 can be in a top surface of said second workpiece layer 708 or in a bottom surface of said first workpiece layer 706. Said first workpiece layer 706 can be affixed to said second workpiece layer 708 with said one or more flaws 216 being between the layers.

Said first workpiece layer 706 and said second workpiece layer 708 can be bonded together and can be configured to mimic dissimilar metals being fused to one another.

Said NDE specimen manufacturing system 134 for manufacturing said NDE test specimen 106 with predictably located said one or more flaws 216 according to said digital flaw map 104 for training user of and testing results from said NDE testing equipment 114. Said NDE specimen manufacturing system 134 comprises said controller computer 118 having said memory 120 and said one or more processors 122, said high energy beam CNC 126, and said NDE test specimen 106 of said workpiece material 602. Said memory 120 comprises said CAD software 124, said CNC software 130 and said digital flaw map 104. Said workpiece material 602 for said NDE test specimen 106 comprising an angle of refraction substantially like an industrial equipment material typically inspected by said NDE testing equipment 114. Said NDE test specimen 106 can be fabricated from said workpiece material 602. Said one or more processors 122 of said controller computer 118 can be configured to execute said CAD software 124 and said CNC software 130. Said CAD software 124 can be configured for reading said digital flaw map 104. Said digital flaw map 104 comprises coordinates of said one or more flaws 216 to be applied to said NDE test specimen 106. Said CNC software 130 can be configured for controlling said high energy beam CNC 126 to apply said digital flaw map 104 to said NDE test specimen 106.

Said high energy beam CNC 126 can be configured to apply said laser beam 128 at said plurality of energy points 906 within a portion of said NDE test specimen 106. Said laser beam 128-micro-fractures a portion of said internal volume 510 of said NDE test specimen 106 to create said plurality of micro-fractured flaws 900. Said high energy beam CNC 126 comprises said laser system 132 for generating said laser beam 128. Said digital flaw map 104 comprises a 3D matrix comprising location and intensity data in said x-axis 304, said y-axis 306 and said z-axis 904.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein".

The invention claimed is:

1. A method of manufacture for creating an NDE test specimen with predictably located one or more flaws according to a digital flaw map for training user of and testing results from an NDE testing equipment, comprising:
    selecting a workpiece material for said NDE test specimen comprising an angle of refraction matching an industrial equipment material,
    fabricating said NDE test specimen from said workpiece material,
    executing a CAD software and a CNC software on one or more processors of a controller computer,
    reading said digital flaw map comprising coordinates of said one or more flaws to be applied to said NDE test specimen with said CAD software, and
    controlling a high energy beam CNC with said CNC software to apply said digital flaw map to said NDE test specimen, and
    virtographing said NDE test specimen comprising
        applying said laser beam at a plurality of energy points within a portion of said NDE test specimen using said high energy beam CNC, and
        micro-fracturing a portion of an internal volume of said NDE test specimen to create a plurality of micro-fractured flaws; wherein,
    "CNC" stands for Computer Numerical Control;
    "NDE" stands for Nondestructive Testing Specimen;
    "CAD" stands for Computer Aided Design;
    said high energy beam CNC comprises said laser system for generating said laser beam; and
    said digital flaw map comprises a 3D matrix comprising location and intensity data in said x-axis, said y-axis and a z-axis.

2. The method of manufacture of claim 1, further comprising:
    applying a laser beam to a top surface or a bottom surface of said NDE test specimen using said high energy beam CNC, and
    removing portions of said NDE test specimen using laser ablation; and
    said high energy beam CNC comprises a laser system for generating said laser beam.

3. The method of manufacture of claim 2, wherein:
    said digital flaw map comprises a 2D matrix comprising instructions for laser intensity and location for creation of said one or more flaws on said NDE test specimen; and
    said digital flaw map comprises a flaw diagram comprising a 2D matrix of said one or more flaws placed along an x-axis and a y-axis.

4. The method of manufacture of claim 3, wherein:
    said flaw diagram is stored on a computer system as a greyscale image file comprising white space and variations of color between white and black; and
    said method of manufacture comprises applying said one or more flaws to said bottom surface with flaws being engraved into said bottom surface with more intensity where said greyscale image file comprises a black pixel, no intensity where said greyscale image file comprises a white pixel, and a proportional intensity according to the darkness of a grey pixel.

5. The method of manufacture of claim 2, wherein:
    said NDE test specimen comprises at least one flat surface among said top surface and said bottom surface,
    said top surface comprises a topside grid and said bottom surface comprises a bottom-side grid, and
    said high energy beam CNC is aligned with said topside grid or said bottom-side grid and apply said one or more flaws according to said NDE test specimen.

6. The method of manufacture of claim 5, further comprising:
    melting a portion of said NDE test specimen around a cylinder shape to from a curved configuration to mimic an industrial pipe shape.

7. The method of manufacture of claim 1, further comprising:
    selecting said workpiece material among crystal, borosilicate glass, and acrylic.

8. The method of manufacture of claim 1, wherein:
    said workpiece material comprises a substantially clear opacity; and
    thereby, said one or more flaws are visible while testing with said NDE testing equipment.

9. The method of manufacture of claim 1, wherein:
    said micro-fracturing comprises starburst cracks in said workpiece material being planar defects with no loss of volume; and
    when clumped together said plurality of micro-fractured flaws are read by said NDE testing equipment as a single reflective surface like said one or more flaws in industrial equipment.

10. The method of manufacture of claim 9, further comprising:
    controlling a density of said plurality of micro-fractured flaws to modify a reflectivity of said plurality of micro-fractured flaws for said NDE testing equipment.

11. The method of manufacture of claim 1, further comprising:
    introducing said one or more flaws between and touching an exterior surface selected among said top surface and said bottom surface of said NDE test specimen.

12. The method of manufacture of claim 11, further comprising:

said digital flaw map can comprise said curved configuration wherein, said digital flaw map accounts for a curved shape of said bottom surface and said one or more flaws of said digital flaw map.

13. The method of manufacture of claim 11, further comprising:

applying additional power with said laser beam when carving a tip of a hook flaw to cause a tip flare to be engraved said NDE test specimen; wherein, Said one or more flaws comprises said hook flaw; and said hook flaw comprises a hook portion, said tip, said tip flare and a surface connection.

14. A method of manufacture for creating an NDE test specimen with predictably located one or more flaws according to a digital flaw map for training user of and testing results from an NDE testing equipment, comprising:

selecting a workpiece material for said NDE test specimen comprising an angle of refraction matching an industrial equipment material, fabricating said NDE test specimen from said workpiece material, executing a CAD software and a CNC software on one or more processors of a controller computer, reading said digital flaw map comprising coordinates of said one or more flaws to be applied to said NDE test specimen with said CAD software, and controlling a high energy beam CNC with said CNC software to apply said digital flaw map to said NDE test specimen; wherein, "CNC" stands for Computer Numerical Control;

"NDE" stands for Nondestructive Testing Specimen;

"CAD" stands for Computer Aided Design;

said NDE test specimen comprises at least one flat surface among said top surface and said bottom surface, said top surface comprises a topside grid and said bottom surface comprises a bottom-side grid, and said high energy beam CNC is aligned with said topside grid or said bottom-side grid and apply said one or more flaws according to said NDE test specimen.

15. The method of manufacture of claim 14, further comprising:

melting a portion of said NDE test specimen around a cylinder shape to from a curved configuration to mimic an industrial pipe shape.

* * * * *